May 29, 1962 W. R. HUNT 3,036,350
AUTOMATIC CABLE TENSIONER
Filed Oct. 19, 1959
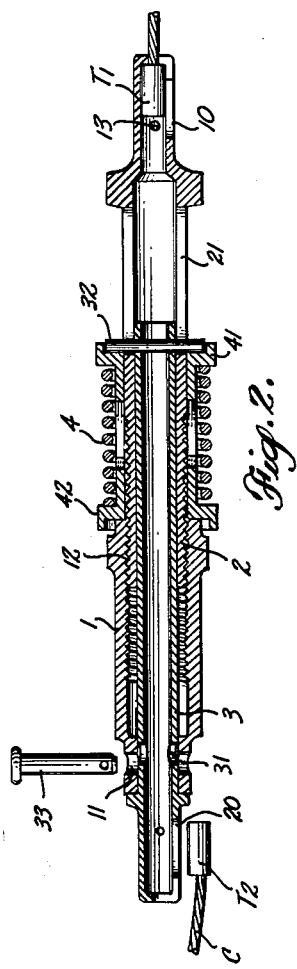
INVENTOR.
WILLIAM R. HUNT
BY
Reynolds, Beach & Christensen
ATTORNEYS

United States Patent Office 3,036,350
Patented May 29, 1962

3,036,350
AUTOMATIC CABLE TENSIONER
William R. Hunt, Seattle, Wash., assignor to Boeing Airplane Company, Seattle, Wash., a corporation of Delaware
Filed Oct. 19, 1959, Ser. No. 847,328
3 Claims. (Cl. 24—123)

There exists a need for a quickly disconnectible device for incorporation in a control cable, as for control of aircraft functions, which when reconnected will restore tension in the cable to a predetermined value without the necessity of using a tensiometer, and which will retain positively the required tension with no possibility of slackening from slippage or like causes. Thereby a mechanic in the field may quickly interrupt the cable, perform necessary service on parts joined thereby, and can restore the connection with full assurance that the intended value of tension will be applied to and maintained in the cable, yet without the necessity of his using other than the simple tools normally available to him.

Turnbuckles are commonly used for obtaining correct tension in such cables, but they ordinarily are not quickly disconnectible, and require the use of a tensiometer to attain accurate tensioning. Turnbuckles with quick-disconnect devices are known, but these still require the use of the tensiometer. The present device incorporates quick-disconnect means, and in addition enables accurate tensioning by the mere act of restoring the device to operative condition.

The general object is as given above. Additionally, it is an object to make such a tensioner which is small, light, rugged and dependable.

The drawings illustrate the tensioner in a presently preferred form.

FIGURE 1 is an isometric view illustrating the environment in which such a device is used.

FIGURE 2 is an axial sectional view through the tensioner, with its parts relaxed and extended, and disconnected from the cable at one end.

FIGURE 3 is an axial sectional view, with parts in positions of use, and FIGURE 4 is an elevational view of the same, from a viewpoint 90° rotated about its axis.

The tensioner, generally designated 9, may be used, for example, to maintain a desired value of tension between the ends of a control cable C extending about a controlling sheave S1 and a distant controlled sheave S2. It comprises a nut 1 threaded upon an outer sleeve 2, the latter being slidable lengthwise upon an inner sleeve 3. Sockets are provided at the opposite ends, in the sleeves 2 and 3 respectively, for receipt of terminals T1, T2 at the opposite ends of the cable C. The terminals enter their sockets through the respective side entrances 10 and 20 when the cable tension is relaxed, and slip outwardly to seats wherein they are secured and whence they cannot be removed until the cable is again relaxed.

Two spring-seating flanged half-sleeves 41, 42 are slidable lengthwise on the outer sleeve 2, near its one end, and a spring 4 urges them apart. Flanged half-sleeve 42 bears against an end of the nut 1, which threads at 12 upon the outer sleeve 2. Flanged half-sleeve 41 bears against a retainer pin 32 that projects from the inner sleeve 3 and slides in a longitudinal slot 21 in the outer sleeve 2. This retainer pin prevents relative rotation between the sleeves 2 and 3, but permits their relative longitudinal movement.

At the opposite end of the tensioner any pair of a series of holes 11 in the nut 1 may come into registry with a hole 31 in the inner sleeve 3, whereby a locking pin 33 may be inserted, to fit snugly in holes 11 and 31, and to prevent rotation of nut 1 upon outer sleeve 2. Only so much play is permitted as between holes 11 and 31 to insure that they can come into registry, despite variations in different units between the threads 12 and the holes.

The spring 4 is chosen of such strength and length, when compressed between flanged half-sleeves 41, 42 to the extent to bring holes 11 and 31 into registry, that it will then produce the required tension in the cable C. Different springs or a given spring differently adjusted can produce different tensions. With the tensioner relaxed, i.e., with locking pin 33 withdrawn and nut 1 threaded back along threads 12, and parts in the position of FIGURE 2, the terminals T1, T2 are engaged in their respective sockets, and locked therein by cotter pins 13 and 23. The locking pin 33 having been removed, the nut 1 is threaded at 12 along the outer sleeve 2, compressing spring 4 and tensioning the cable C, until holes 11 and 31 come into registry and locking pin 33 can be passed through them, as in FIGURES 3 and 4. It is retained, as by a cotter pin 34. When this occurs the spring tension at 4 is, by the design of the tensioner and its spring, calculated to be just the correct tension in the cable. The locking pin 33 secures all parts at this required tension, without possibility of slackening, as by loosening of threaded connections, and the spring is no longer effective. The inner sleeve 3 is pinned at 33 to nut 1, the latter is fixed by threads 12 to outer sleeve 2, and the termini T2, T1 are fixed unyieldingly to sleeve 3 and sleeve 2, respectively. If however the tensioner needs to be disconnected, the spring, in the same manner, assures that the correct tension can always be restored.

The tensioner is small, light, accurate, and rugged. It can be quickly disconnected and reconnected, and when reconnected requires no tensiometer to assure resumption of the desired tension.

I claim as my invention:

1. A device for joining the separate ends of a cable, to tension the cable to a predetermined value and to maintain such value, comprising a nut internally threaded at one end and formed at its opposite end as a guide, an externally threaded outer sleeve whereon said nut is threaded, said outer sleeve protruding from the nut at one end, an inner sleeve guided within said outer sleeve and within the guide of said nut, said inner sleeve protruding from the latter oppositely to the protrusion of the outer sleeve, means for releasably engaging the opposite ends of a cable to be joined and tensioned with the inner and outer sleeves at their protruding ends, respectively, a compression spring bearing at one end against an end of said nut and surrounding the outer sleeve, means carried by the inner end of the inner sleeve and engaged by the other end of said spring to urge the inner sleeve into the nut and the outer sleeve, at a given position of the nut along the outer sleeve, and locking means interengageable between the nut and the protruding end of the inner sleeve when they are in a given position of longitudinal adjustment, with the spring compressed by a given amount between the nut and the inner sleeve, and the nut in its given position along the outer sleeve.

2. A device for joining the separate ends of a cable, to tension the cable to a predetermined value and to maintain such value, comprising a nut, a threaded outer sleeve whereon said nut is threaded, said outer sleeve being slotted longitudinally at its end which protrudes from the nut, an inner sleeve within and slidable longitudinally relative to the outer sleeve, said inner sleeve protruding from the nut and the outer sleeve at its end distant from the slotted end of the outer sleeve, means for releasably engaging the opposite ends of a cable to be joined and tensioned with the inner and outer sleeves at their protruding ends, respectively, a retainer pin projecting from the inner end of the inner sleeve through the slot in the outer sleeve, a compression spring operatively interposed between said pin and the nut, tending to withdraw the inner sleeve into the outer sleeve and nut and to move the cable-end-engaging means together, by reaction from the nut through the threads of the outer sleeve, and exerting a predetermined tensional force between said cable-end-engaging means to a given position of the nut along the outer sleeve, and a locking pin penetrating the nut and the inner sleeve, each thereof having holes to snugly receive said locking pin and to come into registry when the nut, in such given position along the outer sleeve, is slid lengthwise of the inner sleeve by a given distance.

3. A device as in claim 2, including two flanged sleeve elements slidably mounted upon the outer sleeve and bearing respectively against the retainer pin and the facing end of the nut, the spring being interposed between said flanged sleeve elements.

References Cited in the file of this patent

UNITED STATES PATENTS

| | | |
|---|---|---|
| 2,128,030 | Koleno | Aug. 23, 1938 |
| 2,665,128 | Guffey | Jan. 5, 1954 |
| 2,744,420 | Pigford | May 8, 1956 |
| 2,814,210 | Ford | Nov. 26, 1957 |